R. HUSSEY & U. THORNBERG, Sr.
Mole-Plow.
No. 25,649.
Patented Oct. 4, 1859.
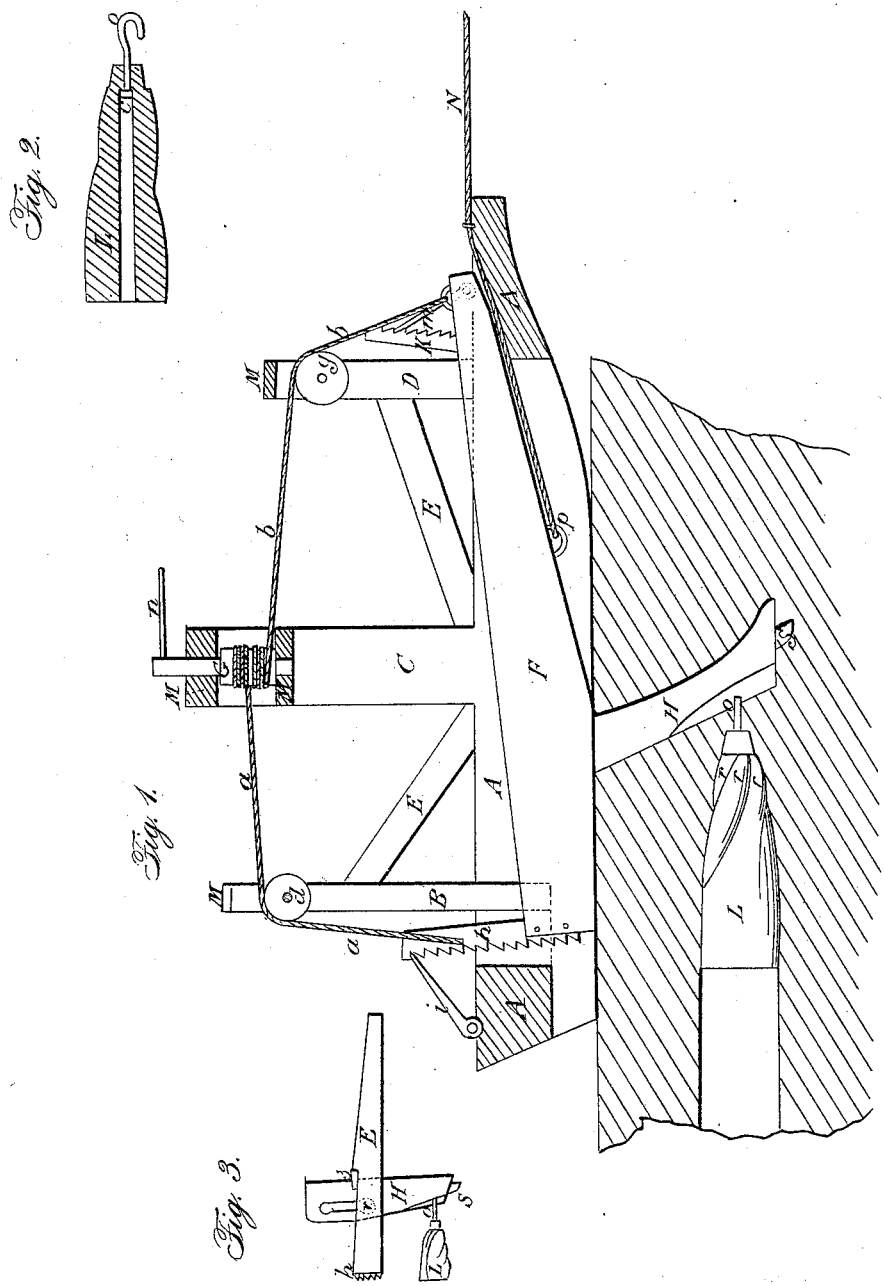

UNITED STATES PATENT OFFICE.

R. HUSSEY AND U. THORNBURGH, SR., OF WALNUT RUN, OHIO.

IMPROVEMENT IN MOLE-PLOWS.

Specification forming part of Letters Patent No. 25,649, dated October 4, 1859.

*To all whom it may concern:*

Be it known that we, RAMETH HUSSEY and URIAH THORNBURGH, Sr., of Walnut Run, in the county of Madison and State of Ohio, have invented certain new and useful Improvements in Underground-Ditching Plows; and we do hereby declare that the following is a full, clear, and exact description of the construction and operation of the same, reference being had to the accompanying drawings, in which—

Figure 1 represents a longitudinal vertical section through said ditching-plow. Fig. 2 represents a longitudinal section through the mole of the plow.

The nature of our invention relates to the manner in which we have arranged the plow-beam, plow-frame, and single capstan, so that by chains or ropes and dogs and pawls, or other similar holding devices, the mole can be raised or lowered at pleasure to regulate the depth of the drain or draw the mole from the ground.

To enable others skilled in the art to make and use our invention, we will proceed to describe its construction and operation.

A represents the frame of the plow, which is constructed of curved timbers in the shape of runners, so as to be drawn over the ground and to support the plow and its accompanying parts.

B, C, and D are posts or uprights, which are secured to the frame A, and which are strengthened by the braces E and cross-ties M.

F represents the plow-beam. It is suspended by ropes or chains $a$ and $b$, which respectively pass over the pulleys $d$ and $g$, and which are wound in opposite directions around the capstan G, for the purpose of raising or lowering the beam F to any desired position. The beam is provided at both its ends with the racks $h$ and $k$, into which the pawls $i$ and $m$ respectively fall, for the purpose of preventing the plow-beam F from descending when it has been adjusted to its proper position.

H represents a colter, which is secured in the usual manner to the plow-beam.

L is the ditching-mole. It is of a conical shape, and is formed on its periphery with spiral flanges $r$. It is attached to the colter by means of a swivel hook or link, $o$, the round head $c$ of which fits against a shoulder in the mole. This attachment of the mole to the colter permits the former to revolve freely on the straight shank of the hook, while the mole is forced through the ground, and simply by the friction between it and the soil.

The rotary motion given to the mole causes it to pass through the ground with less motive power than those that have no rotary motion, and it moreover packs and smooths the perimeter of the ditch, and thus leaves fewer inequalities for the water to rest against, and thus cut out the ditch.

The operation of the machine is as follows: Power being applied to the rope or chain N, which is secured at $p$ to the lower side of the plow-beam, the colter $h$ enters the ground and opens it in the usual manner. As the mole L is forced through the ground in the direction of its axis it is caused to turn on the shank of the hook $o$ by reason of friction upon the spiral flanges on its periphery, thereby boring into the ground and penetrating it like a screw or auger. The rear end of the mole, which is cylindrical, finishes the underground ditch to the shape of a cylinder and with a perfectly-smooth surface. When the mole is to be raised the capstan G is turned by means of the handle $n$, and both ends of the beam are raised simultaneously, and are prevented from descending by the pawls $i$ and $m$ falling into the teeth of ratchets $h$ and $k$ or other equivalent holding device, and the beam can thus be raised and retained to any desired position or varied as the ground rises or falls, so as to retain a uniform grade in the ditch. By this mode of hanging and controlling the mole it is easily drawn out of the ground.

$s$ is a projection on the sole of the colter for forming a crease or gutter in the bottom of the drain for drawing the drainage into and directing it in the bottom of the drain, which prevents the action of the water from working and cutting under the sides, as it were, of the drain.

At Fig. 3 we have shown another plan of drawing the mole out of the ground—viz., by the pin 1, slot 2, and wedge or key 3. By drawing out the wedge 3 the colter will drop until the upper end of the slot catches on the pin, and then the colter will swing back and run out.

Instead of the runnners A we may use trucks or wheels to support the plow.

Having thus fully described the nature of our invention, what we claim therein as new, and desire to secure by Letters Patent, is—

1. Suspending the plow-beam that carries the mole to the plow-frame by means of ropes or chains connecting its ends to one capstan, in combination with suitable catches for holding it at any adjusted height thereon, the whole being arranged in the manner and for the purpose herein set forth and explained.

2. In combination with the rotary mole, suspending the plow-beam by both its ends to ropes or chains which connect with a common capstan on the plow-frame, in combination with racks and pawls for holding said beam when adjusted, the whole being arranged for the purpose and substantially in the manner herein stated.

RAMETH HUSSEY.
URIAH x THORNBURGH.
his mark.

Witnesses:
GEO. W. ATHEY,
PETER PORTER.